US005632168A

United States Patent [19]
Yano

[11] Patent Number: 5,632,168
[45] Date of Patent: May 27, 1997

[54] KEY LOCK DEVICE

[75] Inventor: Tsunenori Yano, Miyazaki, Japan

[73] Assignee: Honda Lock Mfg. Co., Ltd., Miyazaki, Japan

[21] Appl. No.: 415,047

[22] Filed: Mar. 31, 1995

[30] Foreign Application Priority Data

| Apr. 7, 1994 | [JP] | Japan | 6-095665 |
| Apr. 7, 1994 | [JP] | Japan | 6-095666 |
| Dec. 12, 1994 | [JP] | Japan | 6-332128 |

[51] Int. Cl.⁶ ............................... E05B 49/04
[52] U.S. Cl. ................ 70/278; 70/408; 70/413
[58] Field of Search ................ 70/278, 395, 408, 70/413, 252, 256, 257

[56] References Cited

U.S. PATENT DOCUMENTS

| 4,663,952 | 5/1987 | Gelhard | 70/278 |
| 4,849,749 | 7/1989 | Fukamachi et al. | 70/413 X |
| 5,003,801 | 4/1991 | Stinar et al. | 70/278 |
| 5,043,593 | 8/1991 | Tsutsumi et al. | 70/278 X |
| 5,117,097 | 5/1992 | Kimura et al. | 70/278 X |
| 5,307,658 | 5/1994 | Kokubu et al. | 70/408 X |
| 5,373,718 | 12/1994 | Schwerdt et al. | 70/278 |
| 5,398,532 | 3/1995 | Janssen et al. | 70/278 X |
| 5,433,096 | 7/1995 | Janssen et al. | 70/413 X |
| 5,469,727 | 11/1995 | Spahn et al. | 70/408 X |

FOREIGN PATENT DOCUMENTS

| 2518618 | 6/1983 | France | 70/395 |
| 4-15141 | 3/1992 | Japan. | |
| 2231086 | 11/1990 | United Kingdom | 70/278 |

*Primary Examiner*—Lloyd A. Gall
*Attorney, Agent, or Firm*—Longacre & White

[57] ABSTRACT

A key lock device for use in vehicle engine ignition comprising signal transmitting/receiving coils provided on a key and a key cylinder respectively for transmitting and receiving radiowave signals between each other upon insertion of the key into the key cylinder, to judge the authenticity of the key, wherein the coiled antenna is wound coaxially around the key cylinder, and the coils provided on the key is housed integrally in the grip portion of the key so as to situate coaxially with the coiled antenna wound around the key cylinder when a key shank is inserted into the key cylinder. A holding member is formed integrally to the inside of a grip portion of the key, and the coiled antenna provided on the key is housed in the holding member. The coiled antenna wound around the key cylinder is insert-molded in the cover member coaxially with a key-inserting axial line.

6 Claims, 10 Drawing Sheets

KEY LOCK DEVICE

BACKGROUND OF THE INVENTION

1. Related Field of Art

The present invention concerns a key lock device for use in vehicles and, more in particular, it relates to a key lock device capable of inhibiting unauthorized use of a duplicate or counterfeit key.

2. Description of the Prior Art

Various antitheft devices for automobiles have been proposed so far and it has been known a vehicle key lock device of such a structure as described, for example, in Japanese Patent Publication No. 15141/1992. In the proposed device, coils are provided on both of a key and a key cylinder that is disposed to a vehicle body for operating an ignition switch, and a magnetic circuit is established between both of the coils upon insertion of the key into the key cylinder to transmit and receive electric signals between each of the coils thereby judging whether the inserted key is an authentic one or not.

In this prior art device, when a radiowave signal generated from the coils of the key cylinder is received by coils on the key, it is converted into an electric power to generate a code signal by the electric power. Since the key lock device of such a structure needs no electric cell on the key, the size and the cost of the device can be reduced. However, in the key lock device of the structure described above, it is still desirable that the efficiency of converting the radiowave signal into the electric power is made as high as possible.

Further, in the key lock device of the structure described above, the coils provided on the key are wound around a shaft-shaped core combined between a key shank and a grip portion of the key and put into contact at two positions with an annular core for coils provided on the key cylinder upon insertion of the key into the key cylinder to establish a magnetic circuit. In this structure, since the key shank portion and the grip portion are intervened by the shaft-shaped core, it is difficult to integrally combine the key shank and the grip portion at high strength, and if it is intended to ensure sufficient strength and rigidity for the combined portion, there is a problem that the size of the grip portion is enlarged or the coil assembling work is made troublesome.

Further, in the key lock device of the structure described above, since the intensity of radiowave signals induced by electro-magnetic coupling between the coils greatly depends on a positional accuracy between the key coils and the cylinder coils when the key is inserted into the cylinder lock, it is desirable that an aimed accuracy in assembling the coils can be obtained easily. Furthermore, since the coils and other relevant parts are incorporated in a restricted narrow space, it is desirable that the structure is made as compact as possible.

OBJECT OF THE INVENTION

In view of the foregoing problems in the prior art it is a primary object of the present invention to provide a key lock device capable of reducing the size of the device and improving a conversion efficiency from a radiowave signal into an electric power.

It is another object of the present invention to provide a key lock device adapted such that the strength of a key can be improved without enlarging the size of a key grip portion or without complicating assembling operation of signal transmitting/receiving means.

A further object of the present invention is to provide a key lock device capable of easily obtaining an aimed assembling accuracy for coils and constituting them in a compact structure.

SUMMARY OF THE INVENTION

According to the present invention, the foregoing primary object can be attained by providing a key lock device comprising:

a signal transmitting/receiving means provided on a key having a key shank and a grip portion and a signal transmitting/receiving means provided on a key cylinder, in which radiowave signals are transmitted and received between both of the signal transmitting/receiving means to each other upon insertion of the key into the key cylinder, to judge whether the inserted key is an authentic one or not, wherein the signal transmitting/receiving means provided on the key cylinder has a coiled antenna wound coaxially around the key cylinder, the signal transmitting/receiving means provided on the key has a coiled antenna housed integrally in the grip portion of the key such that it situates coaxially with the coiled antenna of the signal transmitting/receiving means provided on the key cylinder when the key shank is inserted into the key cylinder.

In a preferred embodiment, the signal transmitting/receiving means provided on the key is housed in a hollow space formed by recessing a portion of a key blank for the grip portion of the key.

In another preferred embodiment, the grip portion of the key is formed by resin molding the key blank together with the signal transmitting/receiving means provided on the key.

In the above-mentioned constitution, since both of the coiled antennas of the signal transmitting/receiving means provided on the key cylinder and on the key, respectively, are situated coaxially to each other, magnetic fluxes generated through them by electro-magnetic coupling flow on a common axial line between both of the coiled antennas, so that the conversion efficiency from the radio-wave into the electric power can be improved.

Further, when the signal transmitting/receiving means is housed in the hollow space formed by recessing a portion of the key blank, the integrity and rigidity of the grip portion with the key shank can be strengthened.

According to the present Invention, another object can be attained by providing a key lock device comprising:

a signal transmitting/receiving means provided on a key having a key shank and a grip portion and a signal transmitting/receiving means provided on a key cylinder, in which radiowave signals are transmitted and received between both of the signal transmitting/receiving means to each other upon insertion of the key into the key cylinder, to judge whether the inserted key is an authentic one or not, wherein the signal transmitting/receiving means provided on the key cylinder has a coiled antenna wound coaxially around the key cylinder, the grip portion of the key has a holding member formed integrally at the inside thereof, and the signal transmitting/receiving means provided on the key is housed to the inside of the holding member.

In a preferred embodiment, the holding member is incorporated to the inside of a hollow space formed by recessing a portion of a key blank for the grip portion of the key.

In another preferred embodiment, the holding member has an aperture formed therein for insertion of the key shank, and the holding member and the key are integrated to each other by inserting the key shank through the aperture.

In the above-mentioned constitution, since the signal transmitting/receiving means provided on the key is housed to the inside of the holding member, external forces which may exert on the signal transmitting/receiving means can be reduced and the efficiency for the assembling operation of the key can be improved.

According to the present invention, the further object can be attained by providing a key lock device comprising:

a signal transmitting/receiving means provided on a key having a key shank and a grip portion and a signal transmitting/receiving means provided on a key cylinder, in which radiowave signals are transmitted and received between both of the signal transmitting/receiving means to each other upon insertion of the key into the key cylinder, to judge whether the inserted key is an authentic one or not, wherein the signal transmitting/receiving means provided on the key cylinder has a coiled antenna wound coaxially around the key cylinder, and the coiled antenna of the signal transmitting/receiving means provided on the key cylinder is insert-molded in a cover member that is disposed, at a front end of the cylinder lock, coaxially with an axial line for the insertion of the key.

In a preferred embodiment, the coiled antenna of the signal transmitting/receiving means provided on the key cylinder is wound around a bobbin to which based ends of connection pins for a connector are secured, and the coiled antenna, the bobbin and the connector are integrally molded together with the case member.

With the above-mentioned constitution, since the coiled antenna of the signal transmitting/receiving means provided on the key cylinder is insert-molded in the cover member disposed at the periphery of a key insertion bole of the cylinder lock, the positional accuracy of the coils relative to the key insertion hole is enhanced and the coil portion can be protected reliably. In particular, since the coils are wound around the bobbin to which the base ends of the connecting pins for the connector are secured and insert-molded together with the bobbin, and the connector to the connection pins is molded integrally to form the cover member, the constitution can be simplified and made compact.

DESCRIPTION OF THE PREFERRED EMBODIMENTS

Preferred embodiments of the present invention will now be explained more specifically with reference to the accompanying drawings.

Figure 1:
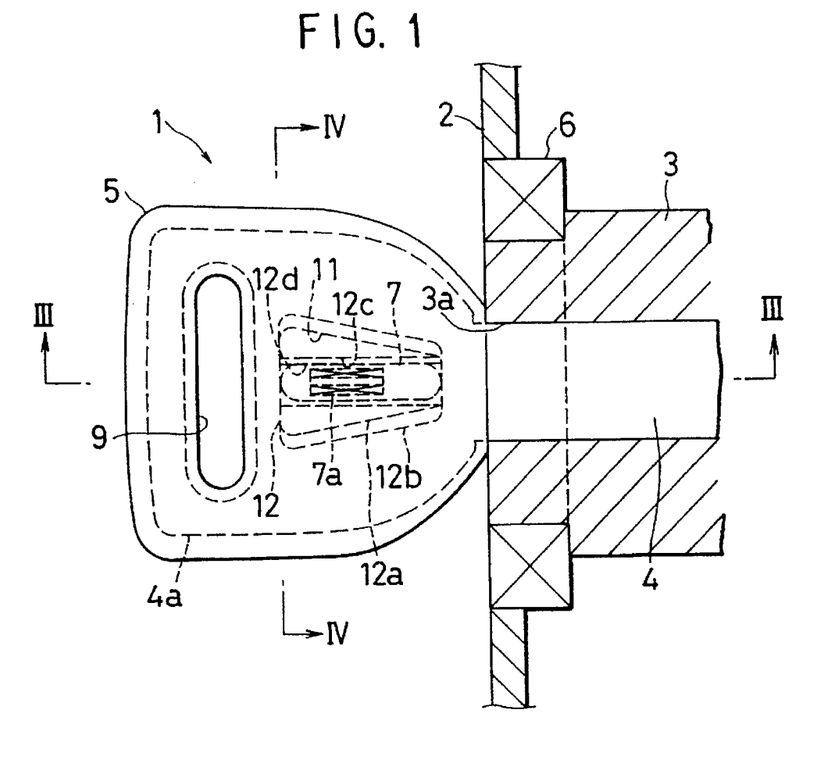
FIG. 1 is a partially cut away front elevational view for a main portion of a key lock device to which the present invention is applied.

FIG. 1 is a front elevational view illustrating a main portion of a key lock device for use in an automobile, to which the present invention is applied. In FIG. 1, a key 1 used for ignition switch operation comprises a key shank 4 and a key grip portion 5 formed as a key blank integrated therewith. The key shank 4 is adapted to be inserted into a key hole 3a of a key cylinder 3 disposed to a steering column or a cylinder housing 2. The key grip portion 5 is formed by insert-molding of a key blank portion 4a.

In the same manner as in the known automobile ignition switch, the key cylinder 3 has a "LOCK" position for fixing a steering wheel, an "OFF" position for turning off ignition, an "ACC" position for enabling operation of various car-mounted equipments, an "ON" position for turning on the ignition switch and a "ST" position for driving a starter motor. The key cylinder 3 is connected to a mechanical contact (not illustrated) which opens or closes in accordance with the rotational position of the key 1 and to a locking mechanism which engages a steering shaft.

The key lock device is adapted to transmit/receive radiowave signals between the key cylinder 3 and the key 1 when the key 1 is Inserted into the key cylinder 3 and rotated to the "ON" position, compare a code signal generated from the key 1 with a private code stored previously in an electronic circuit of the automobile and, if the codes coincide with each other, judge that the key is an authentic one to permit the operation of the engine. As the means for this purpose, cylinder coils 6 are disposed so as to externally and coaxially surround the key cylinder 3 at the front inlet end of a key hole 3a, whereas a transponder 7 is disposed to the grip portion 5 of the key 1, by which radiowave signals are transmitted/received between each of the cylinder coils 6 and the transponder 7.

Figure 2:
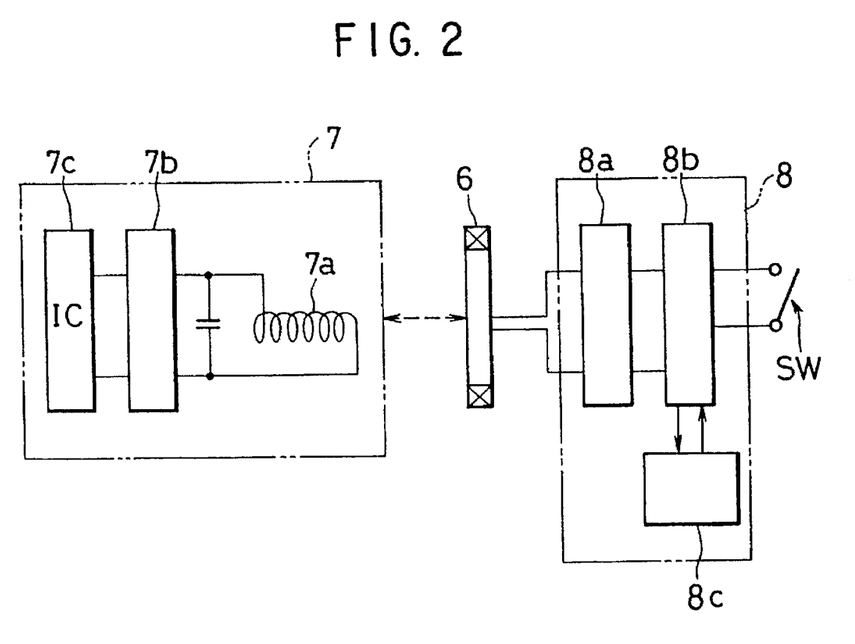
FIG. 2 is a schematic circuit diagram in a key lock device to which the present Invention is applied.

As shown in FIG. 2, the transponder 7 as the signal transmitting/receiving means provided on the key 1 comprises a coiled antenna 7a, a transmitting/receiving circuit 7b electrically connected with the antenna 7a, and an electronic circuit such as an IC chip 7c connected with the transmitting/receiving circuit 7b. The transponder 7 is incorporated in a glass tube closed at both ends each in a rounded shape (refer to FIG. 5). A controller 8 is connected to the cylinder coils 6 as a portion of the signal transmitting/receiving means provided on the vehicle body and the controller 8 has at the inside a transmitting/receiving circuit 8a electrically connected with the cylinder coils 6, a control circuit 8b connected with the transmitting/receiving circuit 8a and a memory circuit 8c connected with the control circuit 8b. Further, the control circuit 8b is connected to an ON position detection switch SW associated operatively with the key cylinder 3.

In the thus constituted key lock device, when the key shank 4 is inserted into the key hole 3a of the key cylinder 3 and rotated to the "ON" position, closure of the ON position detection switch SW is detected by the control circuit 8b, by which the controller 8 is actuated, and a radiowave is transmitted by way of the transmitting/receiving circuit 8a from the cylinder coils 6. When the coiled antenna 7a in the transponder 7 receives the radiowaves, an electromotive force is induced to the antenna 7a by the electromagnetic induction effect. This electric power is converted into a DC current and supplied to the transmitting/receiving circuit 7b and the IC chip 7c, to actuate both of the circuits 7b and 7c. Then, the antenna 7a transmits a radiowave signal in accordance with an inherent code stored previously in the IC chip 7c.

When the cylinder coils 6 receive the inherent code signal transmitted from the antenna 7a, it is inputted by way of the transmitting/receiving circuit 8a to the control circuit 8b. The control circuit 8b compares the inherent code signal from the antenna 7a with a private code stored previously in the memory circuit 8c. Then, when the inherent code coincides with the private code, a permission signal is outputted from the controller 8 to an engine control circuit not illustrated, to permit the operation of the engine. The engine control circuit has a function of actuating, for example, a starter circuit, a fuel circuit or an ignition circuit. On the other hand, if the codes do not coincide to each other, the operation of the engine is not enabled.

While it may suffice that the engine enabled state remains effective at least till the withdrawal of the key 1, this state may be alternatively held for a certain period of time after the withdrawal of the key 1 or held until a door is locked after a driver gets off the car. This will be useful for saving electric power since it is no more necessary to conduct code comparison, for example, upon restarting after the withdrawal of the key 1.

A key blank 4a is integrally formed at one end of a key shank 4 of the key 1. The key blank 4a has an enlarged width so as to facilitate gripping upon rotational operation of the key 1. An intermediate portion of the key blank 4a is partially recessed to form a trapezoidal housing aperture 11 which is narrowed toward the key shank 4. A holding member 12 made of a synthetic resin is housed within a hollow space defined by the housing aperture 11. A longitudinal hole 9 is disposed near the end of the key blank 4 on the side opposite to the key shank 4 for allowing a key holder to pass therethrough.

Figure 3:
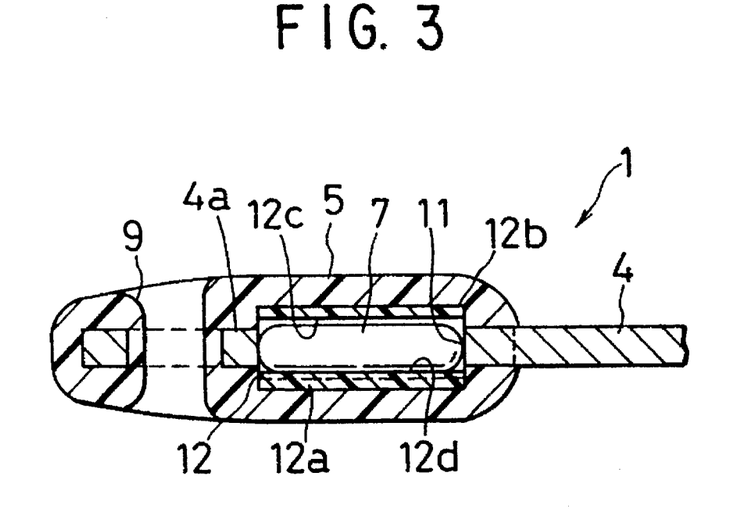
FIG. 3 is a cross sectional view taken along line III—III in FIG. 1.
Figure 4:
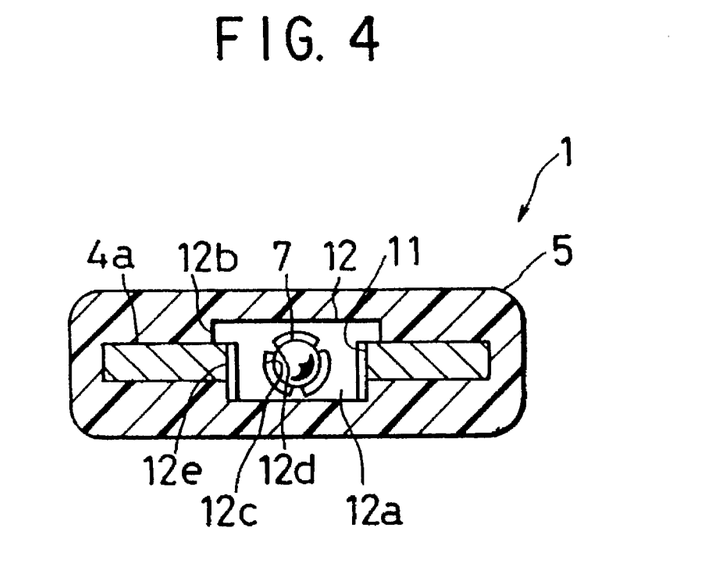
FIG. 4 is a cross sectional view taken along line IV—IV in FIG. 1.

As shown in FIG. 3 illustrating a cross section taken along line III—III in FIG. 1 and also in FIG. 4 illustrating a cross section taken along line IV—IV in FIG. 1, the holding member 12 has a main portion 12a housed in the housing aperture 11 and flanges 12b each extending sideways on one surface (upper surface) of the main portion 12a beyond the lateral side edge 9 of the housing aperture 11. A holding aperture 12c through which the transponder 7 can be inserted is perforated to the main portion 12a of the holding member 12 in a longitudinal direction of the holding member 12. The holding aperture 12c is formed at a position to be aligned with the axial center of the key shank 4 in a state in which the holding member 12 is attached to the housing aperture 11.

As best shown in FIG. 4, axial ridges 12d are disposed on the inner circumferential surface of the holding aperture 12c, each at a position of equally dividing (for instance, dividing by three) the circumference, respectively. The ridge 12d protrudes to such an extent as capable of resiliently supporting the transponder 7 by the resiliency of the material of the holding member 12 itself upon inserting the transponder 7 into the holding aperture 12c (refer to an arrow A in FIG. 5).

A plurality of vertical ridges 12e are also disposed on the lateral side of the main portion 12a of the holding member 12 at appropriate positions (for example, each two ridges on one side). The ridge 12e also protrudes to such an extent as capable of resiliently abutting the main portion 12a against the inner surface of the housing aperture 11 by the resiliency of the material of the holding member 12 itself upon insertion into the housing aperture 11 (refer to an arrow B in FIG. 5).

Figure 5:
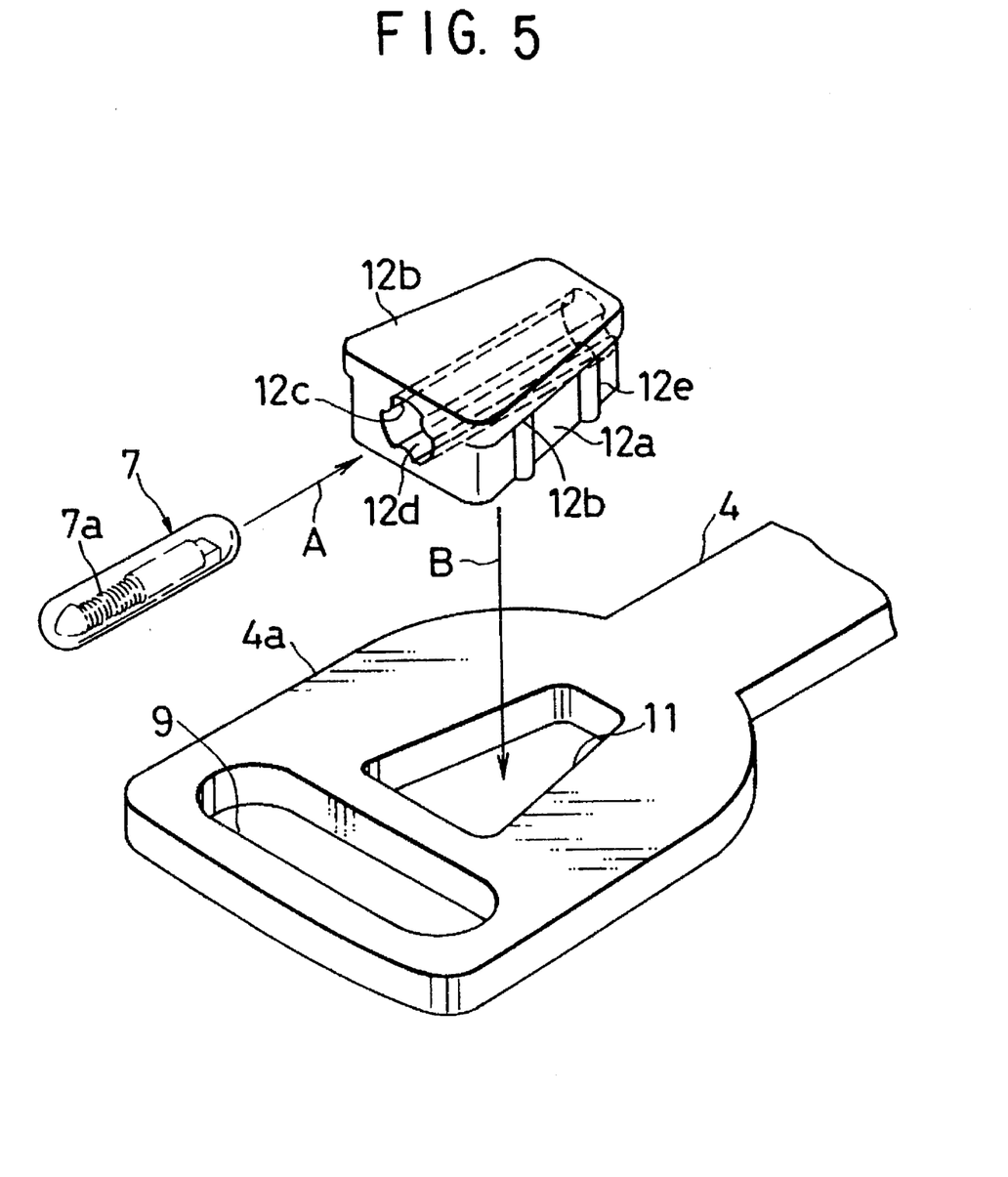
FIG. 5 is an exploded perspective view for a main portion of the key according to the present invention.

When the key 1 having the structure described above is assembled, the transponder 7 is at first inserted into the holding aperture 12c of the holding member 12 in the direction of the arrow A in FIG. 5. Then, the transponder 7 is held in a press-fitting state in the holding aperture 12c under the effect of each of the ridges 12d. Then, the main part 12a of the holding member 12 holding the transponder 7 is inserted into the housing aperture 11 of the key blank 4a, with the flanged portion 12b being at the back, in the direction of the arrow B in FIG. 5. Then, the main portion 12a is held in a press-fitting state in the housing aperture 11 under the effect of each of the ridges 12e. In this embodiment, the position for the flanges 12b is determined such that the flanges 12b abut against the upper surface of the key blank 4a with the axial centers for the holding aperture 12c and the key shank 4 being aligned with each other. That is, when the holding member 12 is mounted to the key blank 4a, the coiled antenna 7a in the transponder 7 is positioned coaxially with the key shank 4.

As described above, since the transponder 7 is held resiliently in the holding member 12 being raised from the inner circumferential wall by the ridges 12d, it is protected from external forces and has increased shock resistance. Further, since the grip portion 5 is formed by resin molding the outer surface of the key blank 4a so as to cover the transponder 7 together with the holding member 12, the transponder 7 can be fixed securely within the grip portion 5.

When the thus constituted key 1 is inserted into the key hole 3a of the key cylinder 3, the coiled antenna 7a of the transponder 7 and the cylinder coils 6 are opposed coaxially to each other. When magnetic fluxes are generated in a direction passing through the axial center of the coiled antenna 7a, the electro-magnetic coupling can be maximized and, accordingly, such positioning of the transponder 7 relative to the cylinder coils 6 is advantageous, in view electro-magnetic conversion efficiency, by which radiowave communication can be conducted satisfactorily with respect to the cylinder coils 6.

Figure 6:
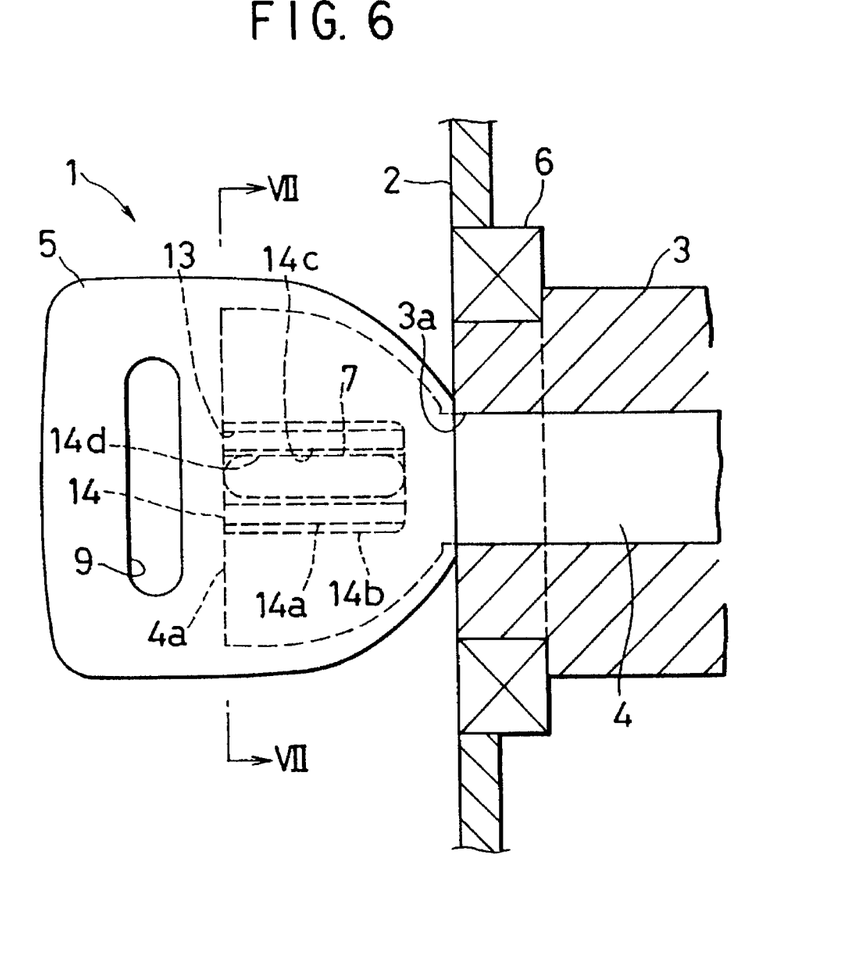
FIG. 6 is a view, corresponding to FIG. 1, illustrating a second embodiment according to the present invention.
Figure 7:
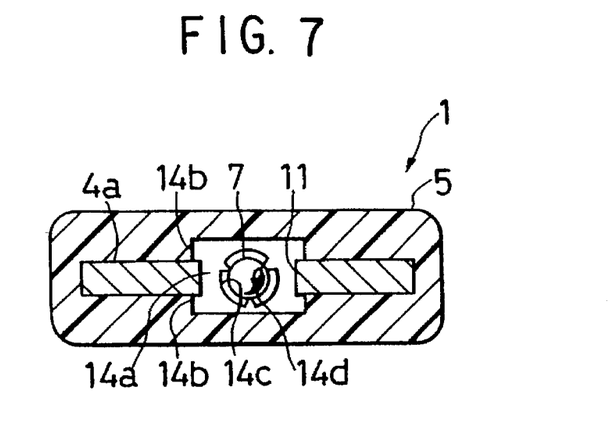
FIG. 7 is a cross sectional view taken along line VII—VII.

FIG. 6 is a view, corresponding to FIG. 1, illustrating a second embodiment of a key lock device according to the present invention and FIG. 7 is a cross sectional view corresponding to FIG. 4, in which corresponding portions to those of the first embodiment carry same reference numerals, for which duplicate explanation will be omitted.

In the second embodiment, a key blank 4a formed Integrally with a key shank 4 has such a length as the free end thereof is aligned with an outer end of a transponder 7. In the first embodiment, the circumference of the transponder 7 is entirely surrounded with the housing aperture 11. However, a housing recess 13 is formed as a U-shaped configuration so as to surround the transponder 7 on three sides in the second embodiment. Then, a holding member 14 for holding the transponder 7 is formed such that a main portion 14a is housed tightly in the housing recess 13, and paired flanges 14b, 14b seized upper and lower surfaces of the key blank 4 along the inner circumferential edge of the blank that defines the housing recess 13. A holding structure for the transponder 7 by a holding aperture 14c and ridges 14d of the holding member 14 is similar to that in the first embodiment.

Also in the second embodiment, a key blank 4a made of metal is present along both lateral sides of the transponder 7 and a grip portion 5 is molded integrally by resin molding the key blank 4a, so that stresses can be prevented from exerting on the transponder 7 upon rotation of the key 1.

In the second embodiment, the transponder 7 is at first press-fitted in the holding member 14. Then, the portion formed between a pair of flanges 14b is aligned with the inner side edge of the key blank 4a that defines the housing recess 13 at the leftmost open end, and then the holding member 14 is inserted to the rightmost closed end of the housing recess 13. Subsequently, by resin molding the key blank 4a together with the holding member 14, a grip portion 5 of the same shape as in the first embodiment is molded integrally. Also in the second embodiment, the axial centers of the holding aperture 14c and the key blank 4a are aligned with each other, and the positioning of the transponder 7 relative to the cylinder coils 6 is advantageous in view of the electro-magnetic conversion In the same manner as in the first embodiment.

As has been described above according to the preferred embodiments of the present invention, since the coiled antenna on the key and the cylinder coils on the key cylinder are positioned coaxially with each other the efficiency of the radiowave communication between both of them can be optimized. Further, since the coiled antenna on the key is housed within the hollow space formed by recessing the base portion of the key main body, the efficiency for the assembling operation is satisfactory. Further, since the grip portion is formed by applying resin molding covering the base portion of the key blank housing the transponder to reduce the stresses exerting on the transponder upon rotation of the key, strength and rigidity can be ensured without taking any special shape and the size of the grip portion can be decreased easily.

Figure 8:
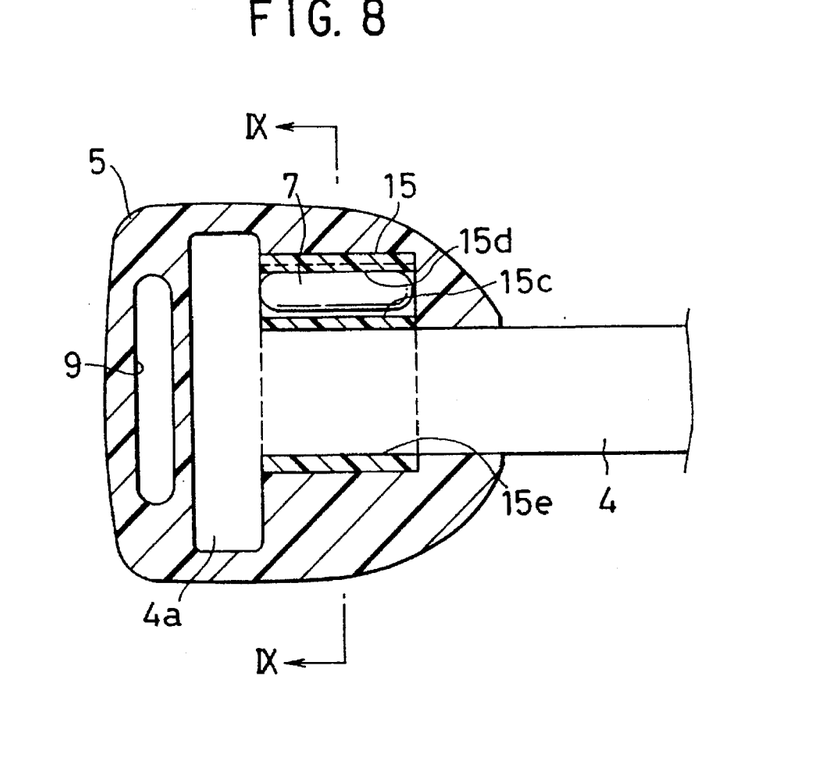
FIG. 8 is a partially cut away front elevational view for a main portion of a key illustrating a third embodiment according to the present invention.
Figure 9:
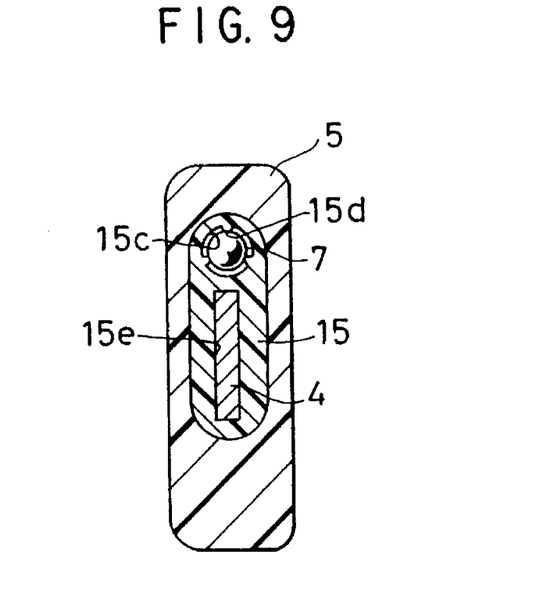
FIG. 9 is a cross sectional view taken along line IX—IX in FIG. 8.

FIG. 8 and FIG. 9 illustrate a third embodiment of the key 1 according to the present invention. In the third embodiment, a key shank 4 and a key blank 4a are orthogonal to each other in a T-shaped configuration. A holding member 15 has an insertion aperture 15c for holding a transponder 7 and an insertion aperture 15e formed in parallel with the holding aperture 15c for inserting the key shank 4. In the third embodiment, a grip portion 5 is formed, for example, by the steps of inserting to hold the transponder 7 in the insertion aperture 15c, inserting the key shank 4 through the insertion aperture 15e with one end of the holding member 15 being abutted against the key blank 4a at a joined portion with the key shank 4 and insert-molding the joined portion of the key shank 4 and the key blank 4a together with the holding member 15. A holding structure for the transponder 7 by the holding aperture 15c and the ridges 15d of the holding member 15 is similar with both of the first and the second embodiments.

Figure 10:
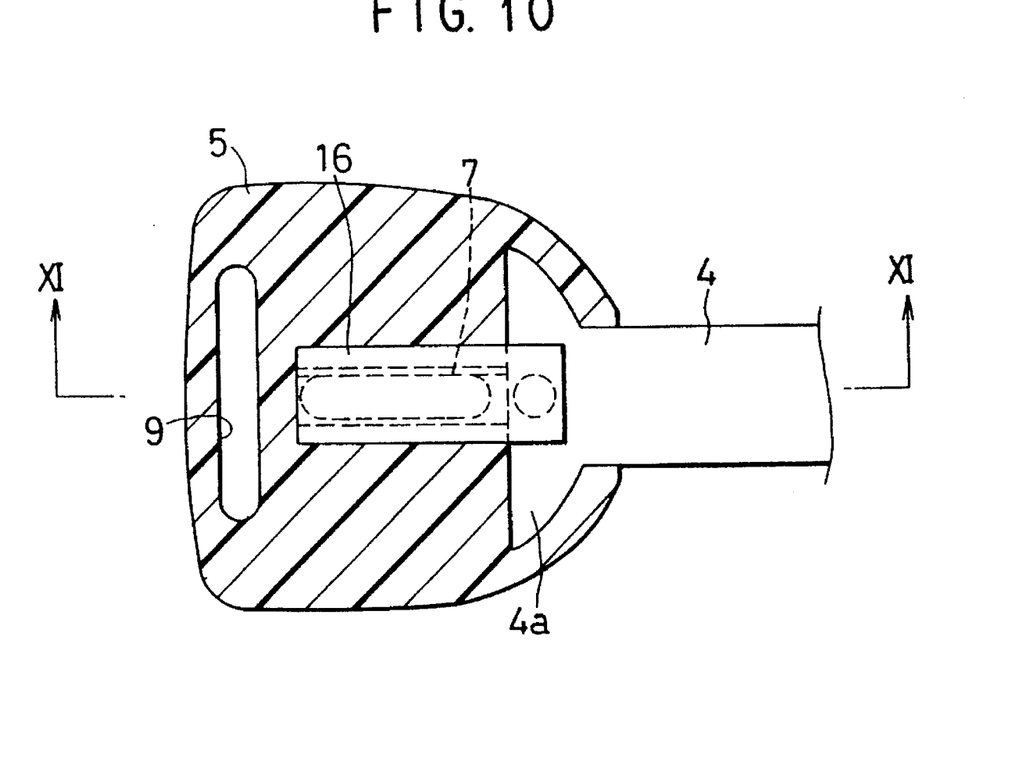
FIG. 10 is a partially cut away front elevational view for a main portion of a key illustrating a fourth embodiment according to the present invention.
Figure 11:
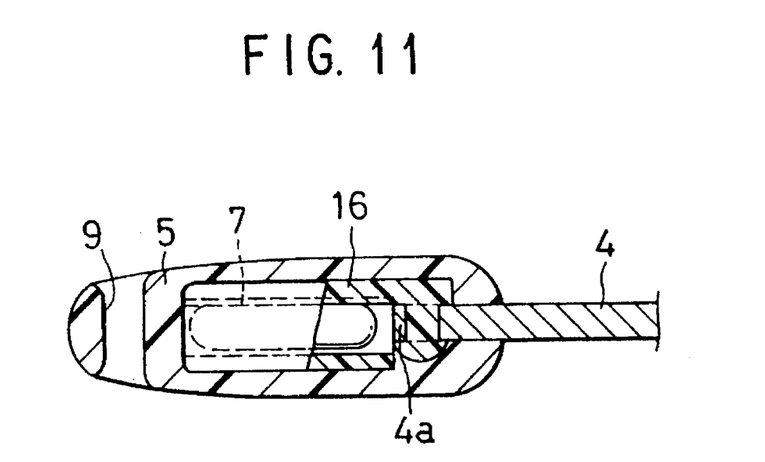
FIG. 11 is a cross sectional view taken along line XI—XI in FIG. 10.

FIG. 10 and FIG. 11 illustrate a fourth embodiment of the key 1 according to the present invention. A key shank 4 and a key blank 4a are orthogonal to each other in a T-shaped configuration also in this fourth embodiment. A holding member 16 housing a transponder 7 is secured to a rear end (leftmost end) of the key blank 4a by means of heat caulking or the like and then a grip portion 5 is formed by resin molding. In this embodiment, since the transponder 7 is not surrounded by the metal key blank 4a, undesired effects on the electro-magnetic coupling can be reduced. In this instance, a required torsional strength can be ensured by forming the grip portion 5 with a synthetic resin material of high rigidity. A holding structure of the transponder 7 to the holding member 16 is similar to each of the first to third embodiments.

Figure 12:
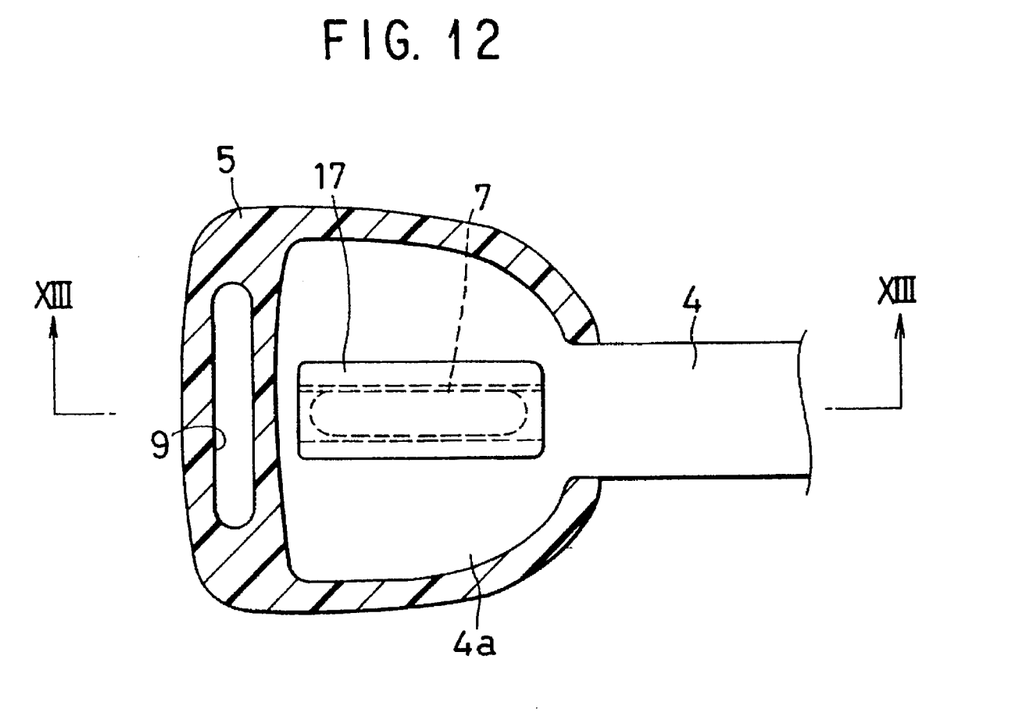
FIG. 12 is a partially cut away front elevational view for a main portion of a key illustrating a fifth embodiment according to the present invention.
Figure 13:
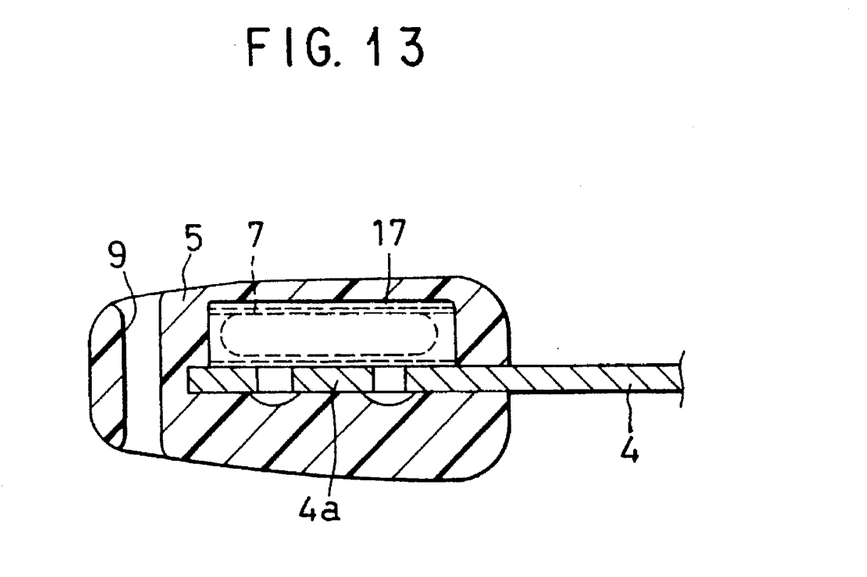
FIG. 13 is a cross sectional view taken along line XIII—XIII in FIG. 12.

FIG. 12 and FIG. 13 show a fifth embodiment of the present invention, in which a holding member 17 housing a transponder 7 is disposed along one of the surfaces of a key blank 4a. Although the axial lines of the transponder 7 and a key shank 4 are not coaxial with each other in this embodiment, the strength of the grip portion 5 can be improved. Further, also in this embodiment, a holding structure of the transponder 7 to the holding member 17 is similar with each of the first to third embodiments.

As has been described above, in the modified embodiments according to the present invention, since the transponder as the signal transmitting/receiving means provided on the key is disposed to the grip portion of the key being housed in the inside of the holding member, stresses exerting on the transponder upon rotational operation of the key can be reduced, so that the strength and the rigidity can be improved without adopting any special shape, to easily decrease the size of the grip portion. Particularly, in the embodiment having the holding member having the key shank insertion aperture, the efficiency for the assembling operation can be improved further.

Figure 14:
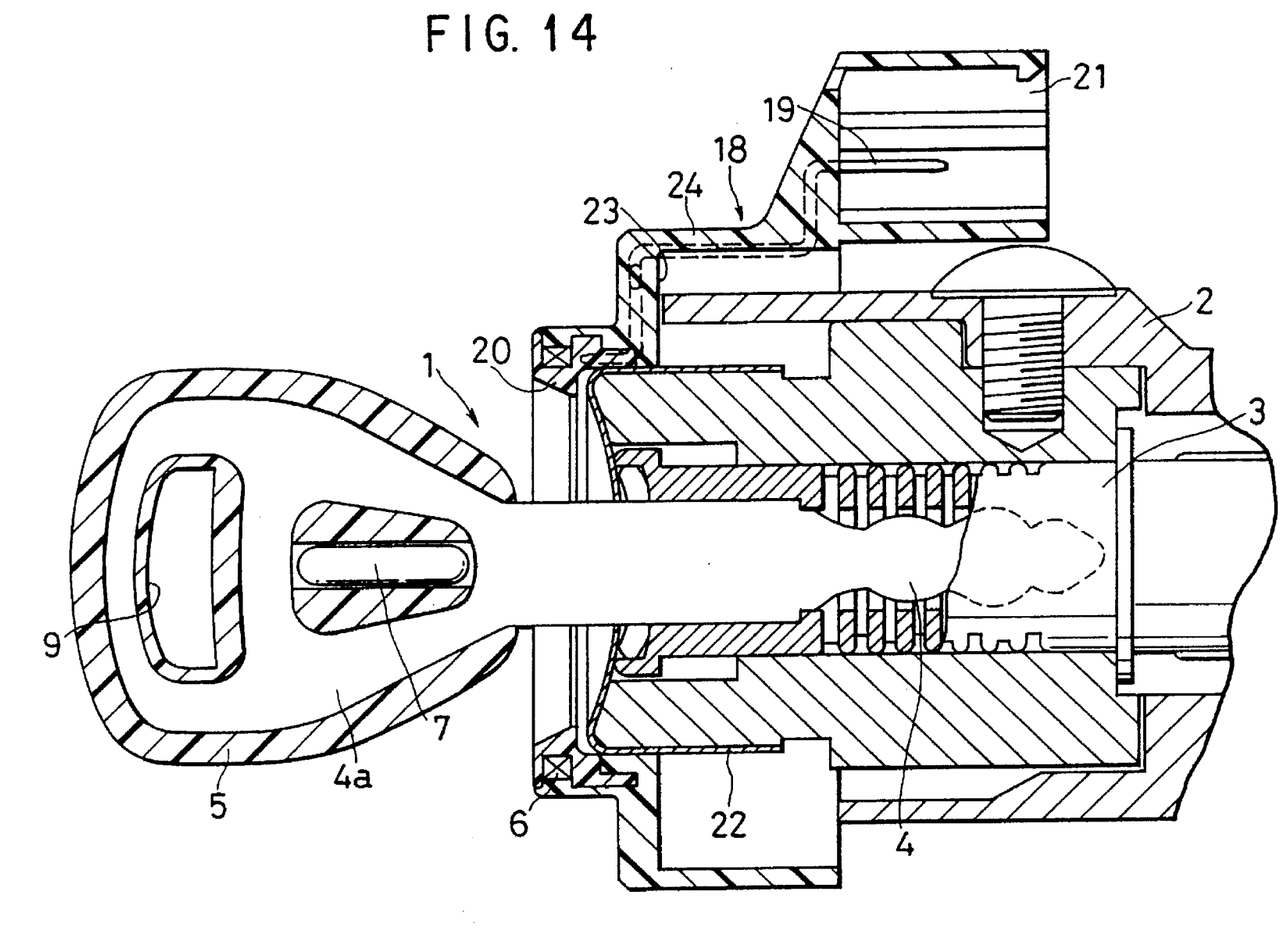
FIG. 14 is a side elevational cross sectional view for a main portion of a key lock device illustrating a sixth embodiment according to the present invention.
Figure 15:
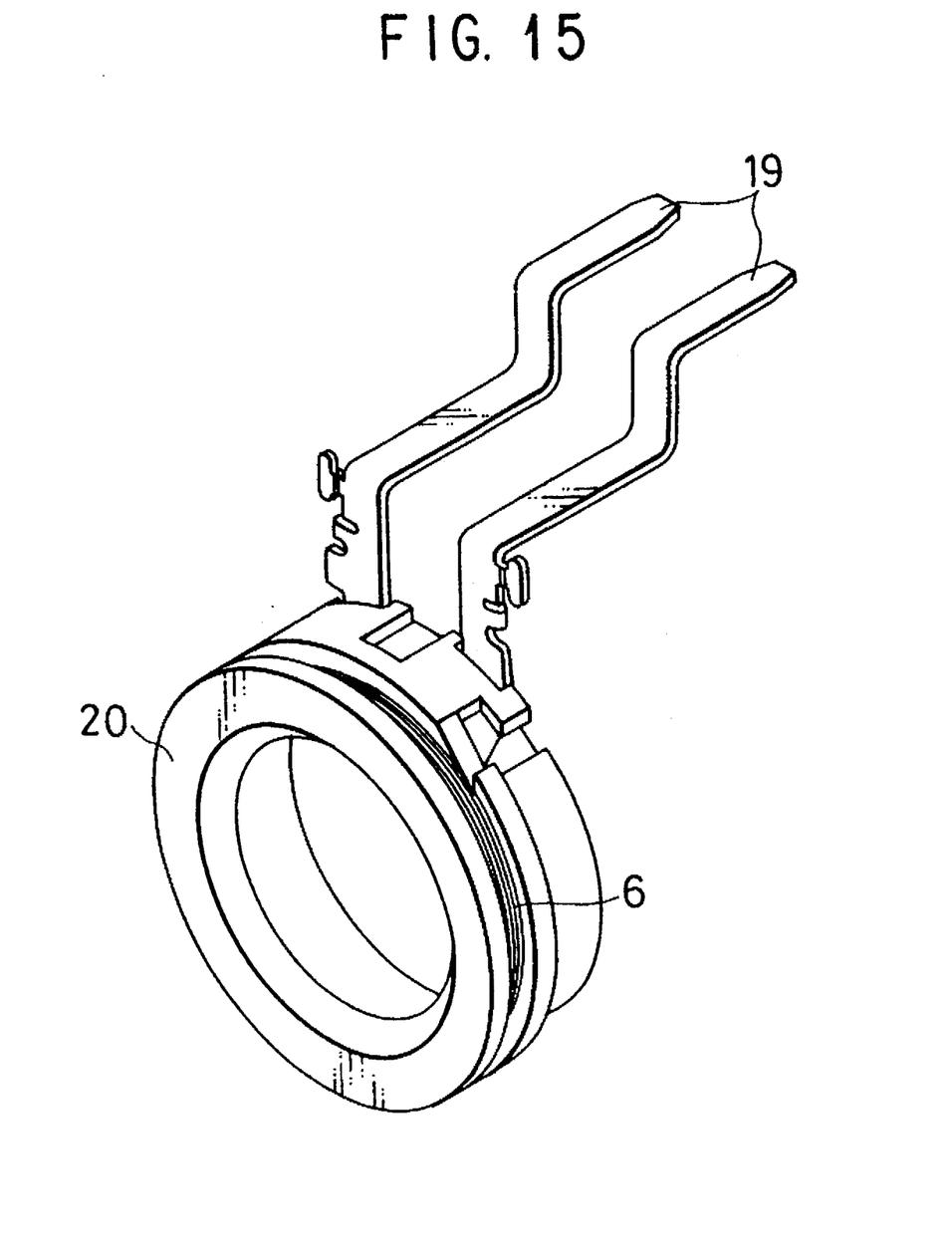
FIG. 15 is a perspective view for a coil bobbin element used in the embodiment shown in FIG. 14.
Figure 16:
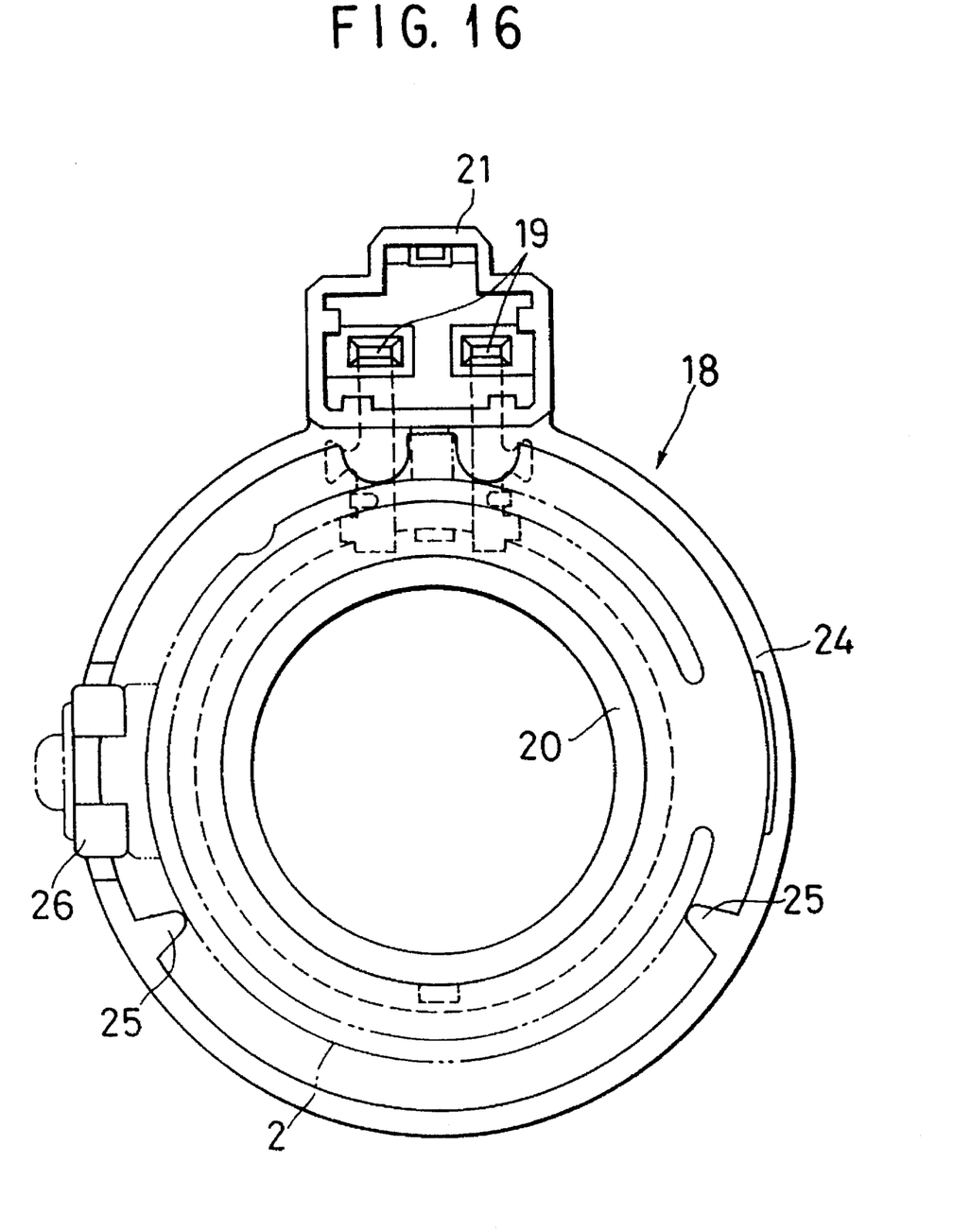
FIG. 16 is a side elevational view of a cover member shown in FIG. 15 in which coils are insert-molded.

FIG. 14 to FIG. 16 illustrate a sixth embodiment according to the present invention, in which corresponding components with those in the previous embodiments carry the same reference numerals for which duplicate explanations will be omitted.

FIG. 14 is a side elevational cross sectional view illustrating a main portion of a key lock device for an ignition switch of an automobile to which the present invention is applied.

In FIG. 14, a key 1 comprises a key shank 4 to be inserted in a cylinder lock 3 which is disposed in a housing 2 secured to a steering column and a grip portion 5 formed by insert-molding a key blank 4a integrated to one end of the key shank 4.

In the same way as the embodiments described previously, the cylinder lock 3 is made rotatable when mechanical codes coincide with respect to the key 1 upon insertion of the key 1 and it is connected with a mechanical contact that turns ON and OFF and the locking mechanism 5 that engages the steering shaft in accordance with the rotational position of the key 1.

The key lock device is adapted to transmit and receive radiowave signals between the cylinder lock 3 and the key 1 to each other upon insertion of the key 1 into the cylinder lock 3, compare the code signal transmitted from the key 1 with a private code stored previously in the automobile and, if both of the codes coincide between them, judge that the inserted key is an authentic one thereby permitting the operation of the engine. For this purpose, coils 6 are disposed as a signal transmitting/receiving means provided on the cylinder lock so as to externally and coaxially surround the cylinder lock 3 at the end of the key insertion hole and a transponder 7 as the signal transmitting/receiving means provided on the key is buried in the grip portion 5 of the key 1.

As shown already in FIG. 2, the transponder 7 provided on the key 1 comprises a coiled antenna 7a, a transmitting/receiving circuit 7b electrically connected with the antenna 7a, and an electronic circuit such as an IC chip 7c connected with the transmitting/receiving circuit 7b. The transponder 7 is housed in a glass tube closed at both ends each in a rounded shape. A controller 8 is connected to the key coils 6 disposed on the vehicle body and the controller 8 has at the inside a transmitting/receiving circuit 8a electrically connected with the cylinder coils 6, a control circuit 8b connected with the transmitting/receiving circuit 8a and a memory circuit 8c connected with the control circuit 8b. Further, the control circuit 8b is connected to an ON position detection switch SW associated operatively with the key cylinder 3.

In the thus constituted key lock device, when the key shank 4 is inserted into the key hole 3a of the key cylinder 3 and rotated to the "ON" position, closure of the ON position detection switch SW is detected by the control circuit 8b, by which the controller 8 is actuated, and a radiowave signal is transmitted by way of the transmitting/receiving circuit 8a from the cylinder coils 6. When the antenna 7a in the transponder 7 receives the radiowave signal, an electromotive force is induced to the antenna 7a by the electro-magnetic induction. This electric power is converted into a DC current and supplied to the transmitting/receiving circuit 7b and the IC chip 7c, to actuate both of the circuits 7b and 7c. Then, the antenna 7a transmits a radiowave signal in accordance with an inherent code stored previously in the IC chip 7c.

When the cylinder coils 6 receive the inherent code signal transmitted from the antenna 7a, it is inputted by way of the transmitting/receiving circuit 8a to the control circuit 8b. The control circuit 8b compares the inherent code signal from the antenna 7a with a private code stored previously in the memory circuit 8c. Then, when the inherent code coincides with the private code, a permission signal is outputted from the controller 8 to an engine control circuit not illustrated, to permit the operation of the engine. On the other hand, if the codes do not coincide to each other, the operation of the engine is not enabled.

The coils 6 are insert-molded in the cover member 18 mounted to the end of the key insertion hole of the cylinder lock 3. As shown in FIG. 15, the coils 6 are wound around a bobbin 20 to which base ends of connection pins 19 for lead wires are previously secured by press fitting and the coils are insert-molded together with the bobbin 20 and the connection pins 19 in the cover member 18. In this case, the axial outer end face and the radial inner circumferential surface of the bobbin 20 are exposed directly and joined at the radial outer circumferential surface and the axial inner end face integrally with the cover member 18. This can reduce the axial size and the radial size of the cover member 18 as small as possible. A receptacle 21 for receiving a plug (not illustrated), to which lead wires from the controller 8 are connected, is molded integrally to the cover member 18 at the periphery of free ends of the connection pins.

In the cover member 18, the bobbin 20 is positioned coaxially with the cylinder lock 3 by direct fitting of the inner circumferential surface of the bobbin 20 to the outer circumferential surface of a cylinder cap 22 fitted to the end of the cylinder lock 3 at the key insertion hole. Then, the inner surface of a flange 23 extended radially outwardly from the axial inner end of the bobbin 20 abuts against the axial outer end of the housing 2 to determine axial positioning. Further, protrusions 25 that are formed on the inner circumferential surface of a diametrically enlarged portion 24 extended from the outer circumferential edge of the flange 23 so as to surround the end of the housing 2 abut against the outer circumferential surface of the housing 2 to provide radial positioning (refer to FIG. 16). The cover member 18 is fixed to the housing 2 by way of a protruding stay 26.

In this way, a high coaxial accuracy can be attained between the inserting axial line of the key 1 and the coils 6 by merely mounting the cover member 18 to the end of the cylinder lock 3 at the key insertion hole. In addition, since the coils 6 and the connection portion for coil conductors and the connection pins 19 are completely buried in a synthetic resin material, the coils 6 can be protected substantially completely.

In the modified embodiment according to the present invention, since the coils are insert-molded in the cover member disposed to the periphery of the key insertion hole of the cylinder lock, the positional accuracy of the coils relative to the key insertion hole can be improved. In addition, water proofness, injury resistance and vibration proofness of the coil portion can be increased. Particularly, when the base portions of the connection pins are secured to the bobbin around which the coils are wound and insert-molded together with the coils, and the lead connection port for the connection pins is molded integrally to the cover member, the structure can be much simplified and made compact.

What is claimed is:

1. A key lock device comprising:

a first signal transmitting/receiving means provided on a key having a key shank at one end and a grip portion at an opposite end, said grip portion having an interior chamber, and a second signal transmitting/receiving means provided on a key cylinder, in which radiowave signals are transmitted and received between said first and second signal transmitting/receiving means to each other upon insertion of the key into the key cylinder, to determine whether the inserted key is authentic, wherein the second signal transmitting/receiving means provided on the key cylinder has a coiled antenna wound coaxially around the key cylinder, the grip portion of the key has a holding member formed integrally at the interior chamber, and the first signal transmitting/receiving means provided on the key is housed within the interior chamber, and wherein the holding member has a holding aperture formed at the inside chamber thereof, and axial ridges extending in the axial direction of said holding aperture and disposed on the inner circumferential surface of said holding aperture, said axial ridges being spaced apart circumferentially from each other and protruded radially so as to give resilient support to the first signal transmitting/receiving means provided on the key.

2. A key lock device as defined in claim 1, wherein the holding member is housed in a hollow space formed by recessing a portion of a key blank for the grip portion of the key.

3. A key lock device as defined in claim 1, wherein the holding member has an aperture for inserting the key shank, and the holding member and the key are integrated to each other by inserting the key shank through the aperture.

4. A key lock device as defined in claim 1, wherein the holding member is secured to one end of a key blank.

5. A key lock device as defined in claim 1, wherein the holding member is disposed along one of surfaces of a key blank of the key, said key blank forming part of the grip portion and being contiguous with said key shank.

6. A key lock device comprising:

a first signal transmitting/receiving means provided on a key having a key shank and a grip portion, and a second signal transmitting/receiving means provided on a key cylinder, in which radiowave signals are transmitted and received between said first and second signal transmitting/receiving means to each other upon insertion of the key into the key cylinder, to thereby determine whether the inserted key is authentic, wherein the second signal transmitting/receiving means provided on the key cylinder comprises a cover member, a connector, a coil bobbin and a coiled antenna, said cover member being disposed at a front end of the key cylinder, coaxially with an axial line for the insertion of the key and integrally molded with the connector, said coil bobbin having said coiled antenna wound around a circumferential surface thereof coaxially with said axial line, and base ends of connecting pins of the connector being secured to the coil bobbin, and said coil bobbin, said coiled antenna and said connector pins being insert molded together in said cover member, and wherein the grip portion of the key has a holding member formed integrally at the inside thereof, the first signal transmitting/receiving means provided on the key is housed to the inside of the holding member, the holding member has a holding aperture formed at the inside thereof, and axial ridges extend in the axial direction of said holding aperture and are disposed on the inner circumferential surface of said holding aperture, said axial ridges being spaced apart circumferentially from each other and protruded radially so as to give resilient support to the first signal transmitting/receiving means provided on the key.

* * * * *